Aug. 13, 1963 W. B. BANKS 3,100,390
METHOD OF AND APPARATUS FOR DETERMINING
PHYSICAL PROPERTIES OF MATERIALS
Filed Dec. 26, 1957 3 Sheets-Sheet 3
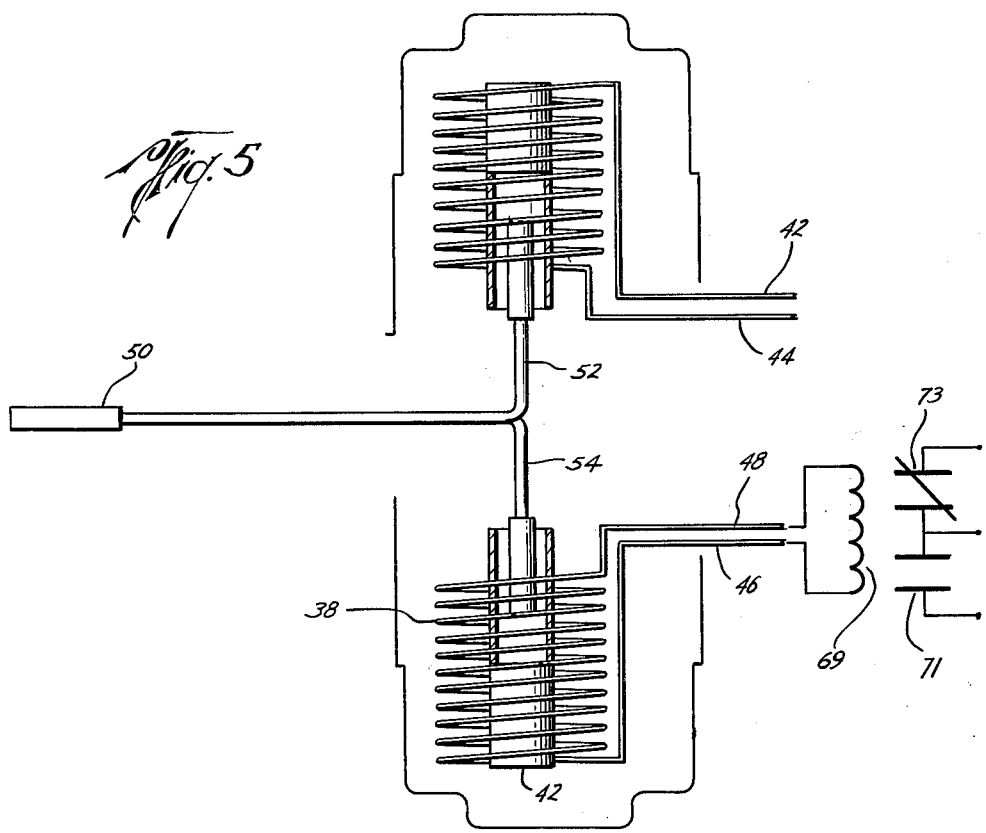
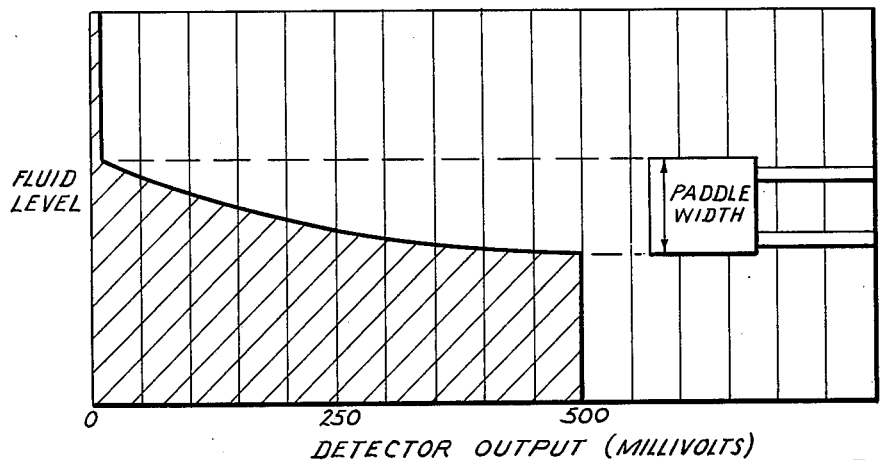
William B. Banks
INVENTOR.
BY James F. Weiler,
Jefferson D. Giller
William A. Stout
ATTORNEYS United States Patent Office 3,100,390
Patented Aug. 13, 1963

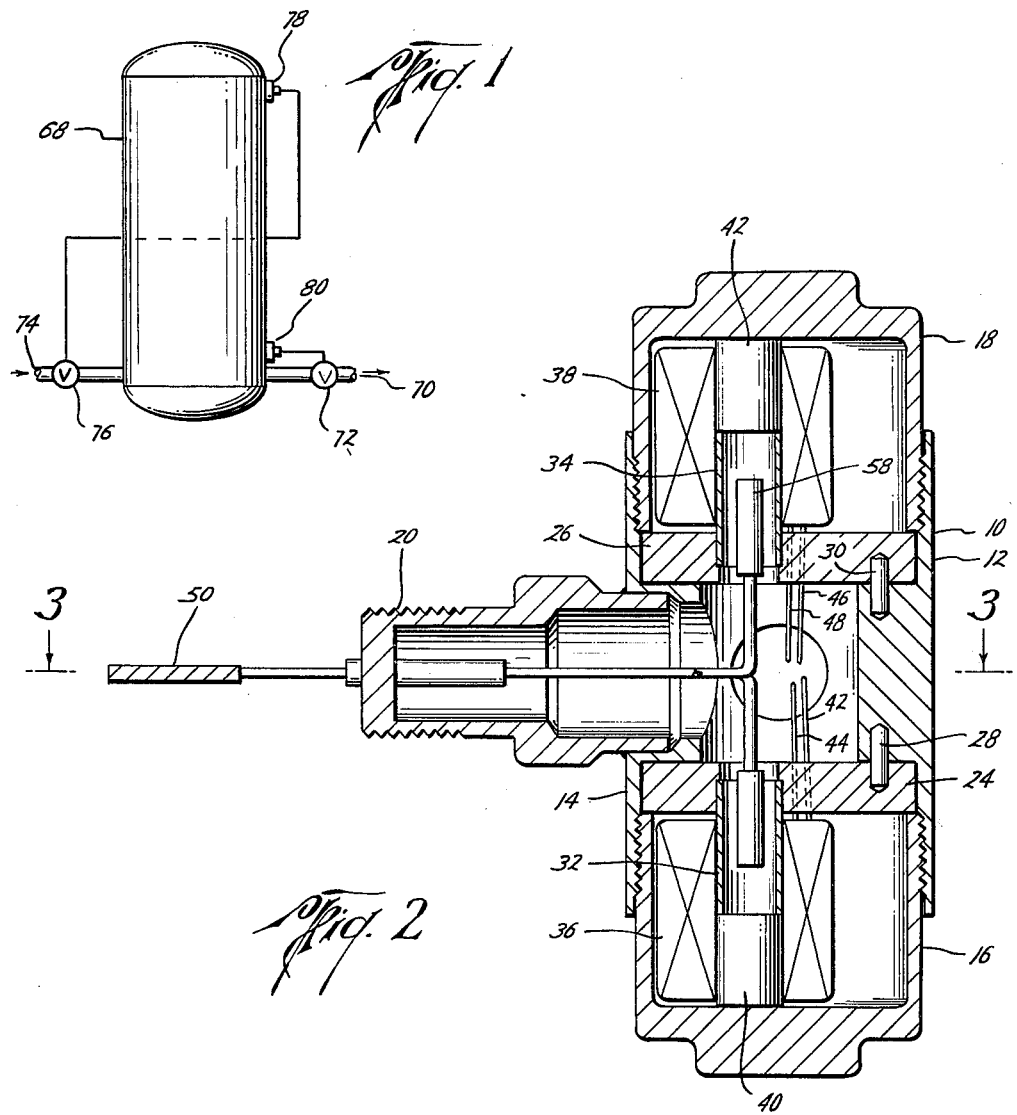

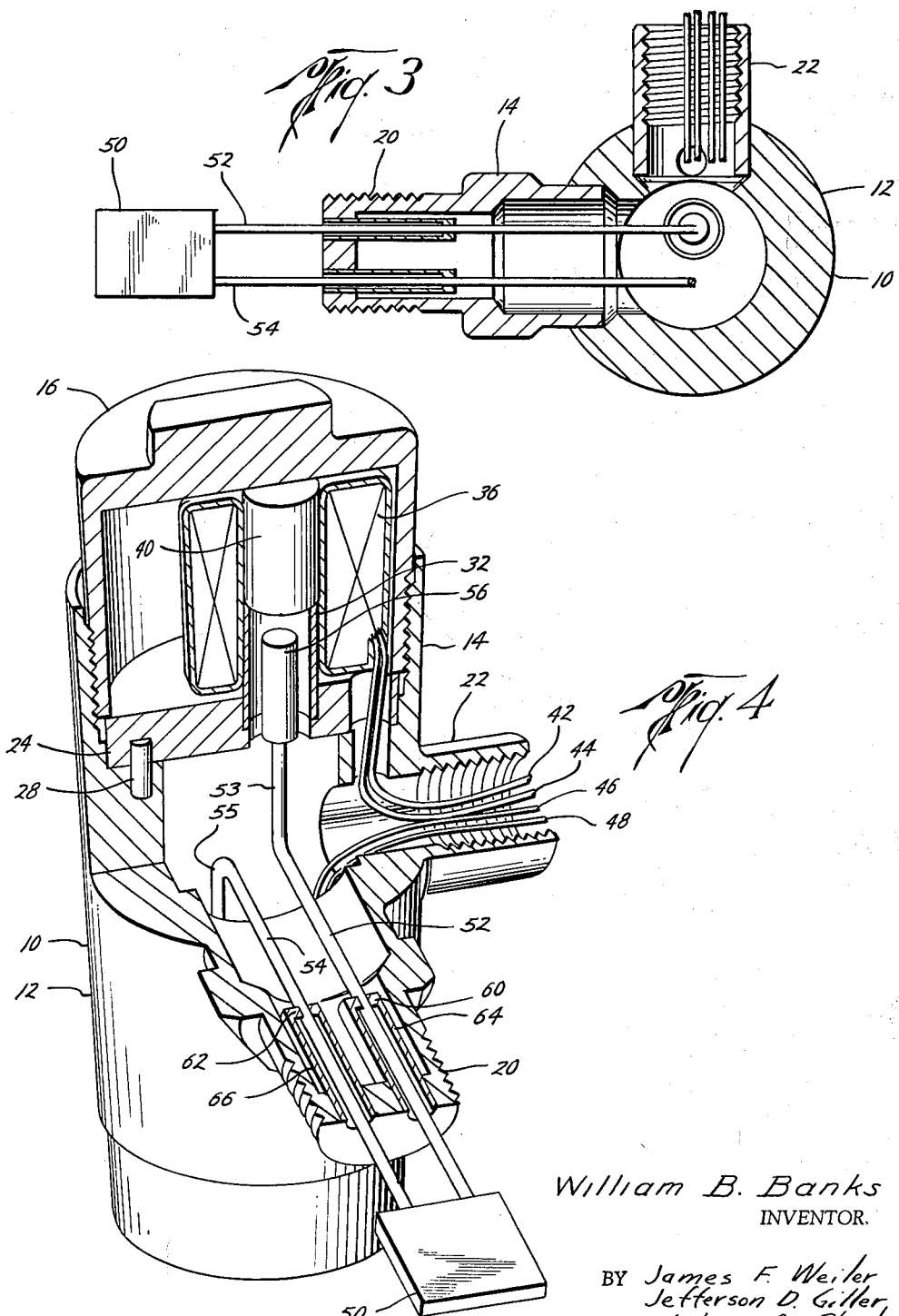

3,100,390
METHOD OF AND APPARATUS FOR DETERMINING PHYSICAL PROPERTIES OF MATERIALS
William B. Banks, Houston, Tex., assignor to Automation Products, Inc., Houston, Tex., a corporation of Texas
Filed Dec. 26, 1957, Ser. No. 705,417
15 Claims. (Cl. 73—32)

The present invention relates to a method of and an apparatus for determining physical properties of materials, and more particularly, relates to a method of and an apparatus for the indication and control of changes in the physical properties of materials. This application is a continuation-in-part of my pending application for a Mass Presence Sensing Device, filed August 4, 1955, Serial No. 526,424, now Patent No. 2,973,639.

The invention is capable of wide general application in connection with the measurement of various physical properties of materials, such as density, specific gravity or viscosity, and material levels, and can be used with liquids, gases, and solids. The invention is useful in the indication and control of the liquid level in various liquid storage and transfer units such as pipelines, reservoirs and tanks and will be hereinafter described with reference to this use.

Several devices have been utilized heretofore for use in liquid containers whereby the level of the liquid in such containers could be determined. Many of these devices, such as floats, possess the disadvantage that they require the extension of some moving part through the wall of the fluid enclosure, thus requiring the use of flexible diaphragms or packing glands or other structural features which effect the efficiency of the measuring device or which would be adversely affected by pressure. It is to overcome these disadvantages that the present invention is directed.

It is therefore a general object of the present invention to provide a vibratory element which is adapted to be positioned within a material container so as to be acted upon by the material therein and which has means for indicating the effect of the material upon the amplitude or frequency of the vibratroy element.

Yet a still further object of the present invention is the provision of an apparatus for determining physical properties of materials by providing two vibratory elements supported at a node point, material sensing means connected to one end of each of the vibratory elements and adapted to transmit vibrations from one vibratory element to the other vibratory element and which is adapted to be positioned within a material container so as to be acted upon by the material therein, means for vibrating the second end of the first vibratory element and means connected to the second end of the second vibratory element to indicate the effect of the material on the amplitude or the frequency of the second vibratory element as the first vibratory element is vibrated.

Another object of the present invention is to provide such a device having a housing whose interior is sealed from the material to be measured and is thereby not affected by contaminating or corrosive elements in the material.

Another object of the present invention is to provide such a material detector device having a vibratory element positioned in the material enclosure while preventing the material from contacting the other elements of the detector device by sealing means located on the vibratory element at its node point.

A still further object of the invention is the provision of a material level indicator having a vibratory element located in the material container in position to be affected when the material reached a predetermined level in the container, and including electromagnetic means for causing the element to vibrate at a constant frequency and electromagnetic means for measuring the change in the amplitude or frequency of vibration of the element caused by the change in material level.

A still further object of the invention is to provide a compact material level detector which may be mounted on a material container in any position.

A still further object of the invention is to provide an apparatus which is inexpensive, durable, and which is positive and accurate in its operation.

Yet a still further object of the present invention is the provision of a method for determining physical properties of a material by placing a material sensing device which is connected to one end of each of two flexible elements supported at a node point into position for contact with the material vibrating the free end of one of the flexible elements, and measuring the change in vibration of the free end of the second flexible element thereby providing an indication of the measured physical property of the material.

Other and further objects, features and advantages of the present invention will appear from the description of a preferred example of the invention, given for the purpose of disclosure, and taken in conjunction with the accompanying drawings, where like character references designate like parts throughout the several views, and where FIGURE 1 is a side elevational view, partly diagrammatic, of one use of the present device, illustrating the use of the present invention as a liquid level control apparatus, FIGURE 2 is a side elevational view, in cross-section, of the present invention showing the details of construction, FIGURE 3 is a cross-sectional view, taken along the line 3—3 of FIGURE 2, FIGURE 4 is a perspective side elevational view of the present invention, partly in section, FIGURE 5 is a diagrammatic drawing of the electrical principle of operation, and FIGURE 6 is a typical response characteristic showing the detector output as the fluid level varies on the paddle and the paddle is vibrated horizontally.

Referring now to the drawings, and particularly to FIGURES 2, 3 and 4, the reference numeral 10 generally designates the device of the present invention here illustrated in its use as a fluid level detector. The fluid level indicator has a casing or housing 12, which includes a central T-shaped tubular portion 14 and tubular side portions 16 and 18, which for ease of manufacture and maintenance are preferably threadedly connected to the central portion 14.

The central tubular portion 14 is preferably externally threaded at its outer end 20 for threadable connection within a threaded opening in a fluid enclosure (not shown) to which the apparatus is to be attached. Also connected to the central tubular portion 14 is an internally threaded connection 22 adapted for threadable attachment to an electrical conduit (not shown) containing the electrical connections to the apparatus, which will be more fully discussed hereafter.

The motor or vibration means assembly is enclosed in and located in the housing end or side portion 16. A retaining disc 24, which is the support for the vibrator assembly, is indexed in the central housing portion 14 by a dowel pin 28 or other suitable means and secured in place by end 16. A tubular nonmagnetic sleeve 32 is supported in the retaining disc 24 by a counter sunk shoulder and extends into the interior of the end 16. Within the end 16 an electromagnetic coil 36 surrounds and is supported by the tubular sleeve 32. A magnetic core 40 is located within the electromagnetic coil 36 at one end of the nonmagnetic sleeve 32. Electrical connections 42 and 44 supply electrical current from an external supply to the electromagnetic coil 36 which sets up vibrations in a vibratory element hereinafter described.

The detecting means or generator assembly is located interior of the other housing end portion 18. A retaining disc 26 which provides the support for the detecting means is indexed in the central portion 14 of the housing by dowel pin 30, and secured in place by end 18 and supported thereon is a nonmagnetic tubular sleeve 34. An electromagnetic coil 38 is disposed around one end and supported by the nonmagnetic tubular sleeve 34. A permanent magnet 42 is disposed within the electromagnetic coil 38 at one end of the nonmagnetic sleeve 34 thus providing a magnetic field for the coil 38. Connected to the electromagnetic coil 38 are electrical connections 46 and 48 which carry the voltage generated in the detecting coil 38 to electrical indicating or control means. As shown in FIGURE 5 a control relay 69 may be provided to operate conventional control contacts 71 and 73. That is, the contacts 71 and 73 are actuated, contact 71 closing and contact 73 opening, by the magnetic coil 69 when sufficient voltage has been impressed on the coil 69 to operate the coil so as to actuate the contacts 71 and 73. The contacts 71 and 73 then may be used to operate independent electrical circuits. Of course, other indicating meters and final control elements may be used.

The vibratory means consist of a paddle 50 and flexible elements or rods 52 and 54, said rods being attached at one end to the paddle 50. At the other ends of the flexible rods 52 and 54, respectively, are attached armatures 56 and 58.

As best seen in FIGURES 3 and 4, the paddle is positioned exteriorly of the housing in order to be positioned in the fluid container to which the liquid detector apparatus 10 is connected. The flexible or vibratory rods 52 and 54 are supported and sealingly secured by welding or other means at points 60 and 62, respectively, intermediate their respective ends. Preferably, the flexible rods 52 and 54 should be secured at their node points so that when one end of a flexible rod is vibrated, the vibration will travel longitudinally along that rod and pass through the node point thereby vibrating the other end. The sealing supports 60 and 62 may be located at the node points of the vibratory rods 52 and 54, respectively, by supporting them from the central portion 14 of the housing by tubular extensions 64 and 66, respectively, or other suitable means. Thus a sealing means is provided which does not interfere with the operation of the apparatus.

Interiorly of the housing, rods 52 and 54 are bent to provide extensions 53 and 55, respectively. Extension 53 extends into the tubular element 32 and has a magnetic armature 56 which vibrates in response to the frequency of the electric voltage applied to the electromagnetic coil 36 and in turn causes rod 52 to vibrate. Extension 55 extends into the tubular element 34 in the detecting assembly and has a magnetic armature 58 in its end which vibrates and sets up a voltage in coil 34 when rod 54 is vibrated by the paddle 50.

It is apparent that the housing structure 12 because of the sealing supports 60 and 62 close off and secure the interior of the housing from contact from the fluid in the fluid container to which the apparatus 10 is attached.

In operating, the apparatus is screwed into an opening in a fluid enclosure such as a tank, as can be seen in FIGURE 1, at the desired position. With the apparatus attached to the tank, the paddle is within the fluid container 68, while the housing is outside of the fluid enclosure. It is to be noted, that unlike float detectors, this apparatus may be attached to the top, bottom, side or at any other position on the fluid enclosure.

As best seen in FIGURES 2, 4 and 5, electricity is connected by electrical conductors 42 and 44 to the electromagnetic coil 36 which constitutes the motor or vibrator means by which the vibratory element is caused to vibrate. When the electromagnetic coil 36 is energized by an alternating current the armature 56 is attracted and released, to cause the vibratory rod 52 to vibrate at the desired frequency. Assuming the level of liquid in the tank is below the vibratory paddle 50, the vibration of the rod 52 is transmitted from its armature end through the node point 60 to the paddle 50 which will vibrate at a predetermined amplitude. The vibration of the paddle 50 will be transmitted from the paddle end of the flexible rod 54 through its node point to its armature 58. The electromagnetic or pick up coil 38 generates a voltage caused by the vibration of the generator armature 58 in the magnetic field of the permanent magnet 42. The signal from this detecting or pick up coil 38 is transmitted through electrical conductors 46 and 48 to any convenient type of electrical circuit having electrical indicating or control means such as a volt meter or a relay coil. Preferably, the device is operated at the resonant frequency of the flexible rods in order to secure sensitive measurements by obtaining the maximum vibration of the paddle 50. The paddle may however be selected to operate above or below resonant frequency to obtain modified characteristics. For example, the paddle may be purposely made light so that output is virtually zero with the paddle operating in gas and output increases as paddle is immersed in liquid as the effective weight of the paddle is increased. Therefore, the device may be utilized as a low level as well as a high level fail-safe device, that is, if the device fails, the output will cease and cause the invention to fail in a safety position.

As soon as the level of the liquid in the fluid container rises to a point at which the paddle 50 is in contact with the liquid the vibration of the paddle will be dampened and the amplitude of vibration will be reduced. Thus a reduction is caused in the voltage produced in the detecting coil 38 and this change in voltage may be indicated on a volt meter or be used to control other apparatus. This change in voltage is therefore an indication of the fluid level.

Similarly, in a reverse manner, the apparatus may be used to detect a low level fluid point. That is, the fluid will dampen the vibration of the paddle until the liquid recedes to the point where the paddle is allowed to vibrate at which time the detector coil 38 will indicate a rise in the output voltage.

Referring to FIGURE 6, a typical response curve shows the relationship between the output voltage from coil 38 and the fluid level.

Referring again to FIGURE 1, the invention shown herein is shown as controlling the level of the liquid in the tank 68. The tank is conventionally provided with an outlet connection 70, controlled by a valve 72 and an inlet connection 74 controlled by valve 76. The valves 72 and 76 are of a conventional electrically operated type valve. Two devices 78 and 80, constructed according to the present invention, are attached to the tank so that the paddle of each device is in communication with the interior of the tank 68. The valve 76 is operable through the device 78 of the invention which is applied to the upper portion of the tank and is operable when the level of the liquid rises above a predetermined upper limit so as to close the valve 76. Similarly, the valve 72 is under the control of the device 80 so as to close the valve 76 when the level of the liquid falls below a predetermined lower limit. Thus the outflow of liquid from the tank will be shut off before the tank is completely emptied and the inflow of liquid to the tank may take place until the tank is filled to the predetermined upper limit.

It is apparent that the invention, as thus constructed, is capable of use with a wide variety of different materials whose density, rate of flow, viscosity or other physical characteristics will vary so as to result in an increase or decrease in the effect exerted on the vibratory paddle 50 so as to change the amplitude or frequency of vibration. However, for purposes of illustration and for example only the invention is shown in its application to liquid level indication and control, but it is capable of many other uses.

It is believed that the method of the invention is apparent from the foregoing description of a presently preferred apparatus of the invention. The method, however, comprises the steps of placing a material sensing means which is connected to one end of two flexible elements supported at their node points into position in a material container for contact with the material therein, vibrating the free end of one of the flexible elements, and measuring the change in vibration of the free end of the second flexible element thereby indicating the measured physical property of the material.

The present invention, therefore, is well adapted to carry out the objects and attain the ends and advantages mentioned as well as others inherent therein. While a presently preferred embodiment of the invention is given for the purpose of disclosure, numerous changes in details of construction, arrangement of parts may be made which will readily suggest themselves to those skilled in the art which are encompassed within the spirit of the invention and the scope of the appended claims.

What is claimed is:

1. An apparatus for determining physical properties of materials in an enclosure comprising, a housing adapted to be connected to the enclosure, vibratory means, said means including two flexible rods, said rods supported by the housing intermediate the ends of said rods, a single paddle secured to one end of each of said flexible rods and positioned for contact with the material, means in the housing for transversely vibrating one of said rods thereby vibrating the paddle and the second rod, and means in the housing for measuring the amplitude of vibration of the second rod.

2. An apparatus for determining the physical properties of materials in a container comprising, a housing adapted to be connected to the container, vibratory means, said means including two flexible rods, said rods supported and sealed intermediate their ends by the housing thereby preventing material from entering the housing from the container but allowing vibration along the rods, a single paddle attached to one end of each of said flexible rods and positioned for contact with the material, means in the housing for vibrating the other end of one of said rods and thereby causing a vibration of the paddle and of the second rod, and means in the housing for measuring the change in the amplitude of vibration of the second rod caused by a change of the material contacting the paddle.

3. The invention of claim 2 in which the means for vibrating the first of said rods and the means for detecting a change in the amplitude of vibration of the second rod are electromagnetic means.

4. The invention of claim 2 wherein the rods are vibrated at their resonant frequency.

5. An apparatus for determining physical properties of a material comprising, vibratory means, said means including two flexible elements, support means connected to said flexible elements intermediate the ends of said flexible elements, material contacting sensing means secured to one end of each of said flexible elements for transmitting the vibration from one element to the other element, means adjacent to and adapted to vibrate the second end of one of said flexible elements thereby vibrating said material sensing means and the other flexible element, and means adjacent the other flexible element for detecting a change in the vibration of the other flexible element.

6. An apparatus for determining physical properties of a material comprising, vibratory means, said means including two flexible elements supported at points intermediate their ends, material contacting sensing means secured to each of the flexible elements on one side of the support points and adapted to transmit vibration from one flexible element to the other flexible element, means on the other side of said support points adapted to transversely vibrate one of said flexible elements thereby transmitting vibration to said material sensing means and the second flexible element, and means for detecting a change in the vibration of the second flexible element.

7. An apparatus for determining physical properties of a material comprising, vibratory means, said means including two flexible elements supported at points intermediate their ends, a single paddle secured to each of the flexible elements at a first end of each of said elements, means adapted to vibrate the second end of one of the flexible elements thereby transmitting vibration to the paddle and the other vibratory element and means for detecting a change in the vibration of the other vibratory element.

8. An apparatus for determining physical properties of a material in a container comprising, a housing adapted to be connected to the container, vibratory means, said means including two flexible elements, said elements supported intermediate their ends, material contacting sensing means secured to one end of each of said flexible elements for transmitting the vibration from one flexible element to the second flexible element, said material sensing means positioned outside the housing and in said container, means in the housing for vibrating the second end of one of the flexible elements thereby vibrating the material sensing means and the second flexible element, and means in the housing for measuring the change in vibration of the second end of the second flexible element.

9. The invention of claim 8 including sealing means connected to the flexible elements at said support points sealing the interior of the housing from the material in the container.

10. An apparatus for determining physical properties of a material comprising, vibratory means, said means including two elongate flexible elements supported at points intermediate their ends, material contacting sensing means secured to a first end of each of the flexible elements and adapted to transmit vibration from one flexible element to the other flexible element, means adapted to continuously vibrate the second end of one of said flexible elements thereby transmitting vibration to said material sensing means and the other flexible element, and means for detecting a change in the vibration of the second vibratory element.

11. An apparatus for determining physical properties of a material comprising, vibratory means, said means including two elongate flexible elements, support means connected to said flexible elements intermediate the ends of said flexible elements, material contacting sensing means secured to the first end of each of said flexible elements for transmitting the vibration from one element to the other element, means adjacent to the second end of one of said flexible elements for transversely vibrating said one flexible element thereby vibrating said material sensing means and the other flexible element, and means adjacent the second end of the other flexible element for detecting a change in the vibration of said other flexible element.

12. The invention of claim 11 wherein the means for vibrating the second end of one of said flexible elements includes means for continuously vibrating said element at a generally constant amplitude.

13. An apparatus for determining physical properties of a material comprising, a housing, vibratory means, said means including two elongate flexible elements, said elements having the same natural resonant frequency, means in the housing for continuously vibrating the first end of one of the flexible elements in a transverse direction, a single material sensing means secured to the second end of each of the flexible elements, said flexible elements being supported in said housing proximate a node point of the resonant frequency of said elements, and means in the housing adjacent the first end of the second flexible element for detecting a change in the vibration of the second element.

14. The method of determining a physical property of a material in a container comprising, placing a paddle connected to the first end of two elongate flexible elements in the container so as to be positioned for contact with the material, supporting said flexible elements at a point intermediate their ends from said container, continuously and transversely vibrating the second end of one of said flexible elements outside of said container, measuring the change in vibration of the second end of the second flexible element at a position outside of said container whereby a change in the vibration of the second end of the second flexible element indicates a measured physical property of the material.

15. The method of determining a physical property of a material comprising, placing a material sensing device connected to a first end of each of two elongate flexible elements and adapted to transmit vibration between said elements in the material, supporting the flexible elements proximate a node point of the resonant frequency of said elements, continuously and transversely vibrating the second end of one of the flexible elements near its resonant frequency, and measuring the change in vibration of the second end of the second flexible element thereby indicating a physical property of the material.

References Cited in the file of this patent

UNITED STATES PATENTS

| | | |
|---|---|---|
| 2,340,507 | Bjork | Feb. 1, 1944 |
| 2,354,923 | McNamee | Aug. 1, 1944 |
| 2,701,469 | Burns | Feb. 8, 1955 |
| 2,808,581 | Findlay | Oct. 1, 1957 |
| 2,839,915 | Roth et al. | June 24, 1958 |

FOREIGN PATENTS

| | | |
|---|---|---|
| 899,057 | France | July 24, 1944 |